UNITED STATES PATENT OFFICE.

HENRY W. MATTICK, OF LAWRENCEBURG, INDIANA.

COMPOSITION FOR FILLING THE PORES OF WOOD.

SPECIFICATION forming part of Letters Patent No. 241,686, dated May 17, 1881.

Application filed August 14, 1880. (Specimens.)

*To all whom it may concern:*

Be it known that I, HENRY W. MATTICK, of Lawrenceburg, Dearborn county, Indiana, have invented a Composition of Matter for Filling the Pores of Wood, of which the following is a specification.

The object of my invention is to produce a composition which may be applied with a brush and will render unnecessary a subsequent rubbing with rags or analogous substance.

I cut twelve ounces of gum-shellac in twenty-six ounces of alcohol, which makes one quart of the resultant. I next take eight ounces of kauri gum, nineteen and a half ounces of spirits of turpentine, and four and one-quarter ounces of boiled linseed-oil, of which one-fourth of an ounce is red lead. This forms a quart of varnish. I then take two ounces of kauri gum, six and one-eighth ounces of raw linseed-oil, two and one-eighth ounces of red lead, and eighteen ounces of spirits of turpentine. This forms a quart of japan. I then mix the gum-shellac cut in alcohol, the varnish, and the japan with about twenty-six ounces of spirits of turpentine, when I have about one gallon of my composition for filling the pores of wood. I have tested its efficacy by numerous experiments, and find that it fully answers the purpose for which it is intended.

Having thus described all that is necessary to a full understanding of my invention, what I claim as new is—

A composition for filling the pores of wood, consisting of gum-shellac cut in alcohol, kauri gum, spirits of turpentine, drying-oil, raw linseed-oil, and red lead, in about the proportions described.

HENRY WILLIAM MATTICK.

Witnesses:
JOHN KNOEBEL,
CHRIST. LOMMEL.